G. W. BRINGMAN.
AUTOMOBILE SIGNAL LAMP.
APPLICATION FILED SEPT. 30, 1919. RENEWED APR. 8, 1921.
1,381,701.
Patented June 14, 1921.
3 SHEETS—SHEET 1.
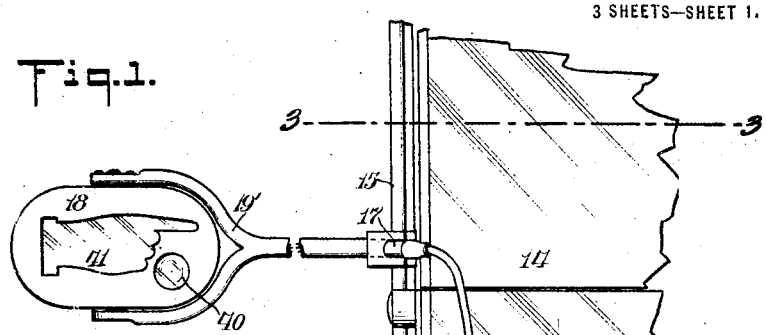
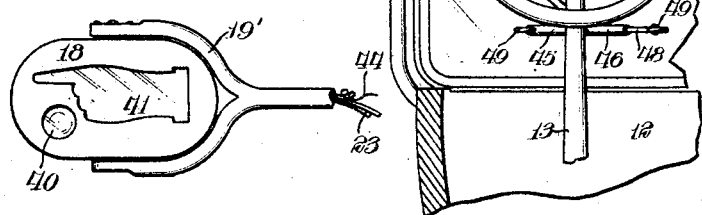
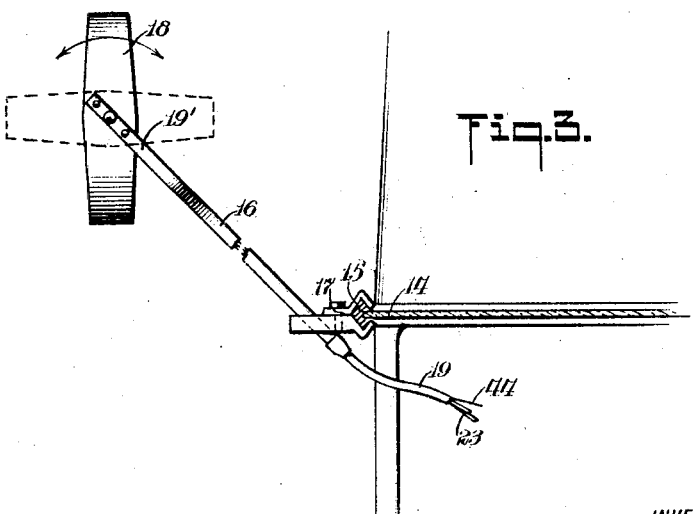
WITNESSES:
INVENTOR
George W. Bringman
BY
Albert M Austin
ATTORNEYS

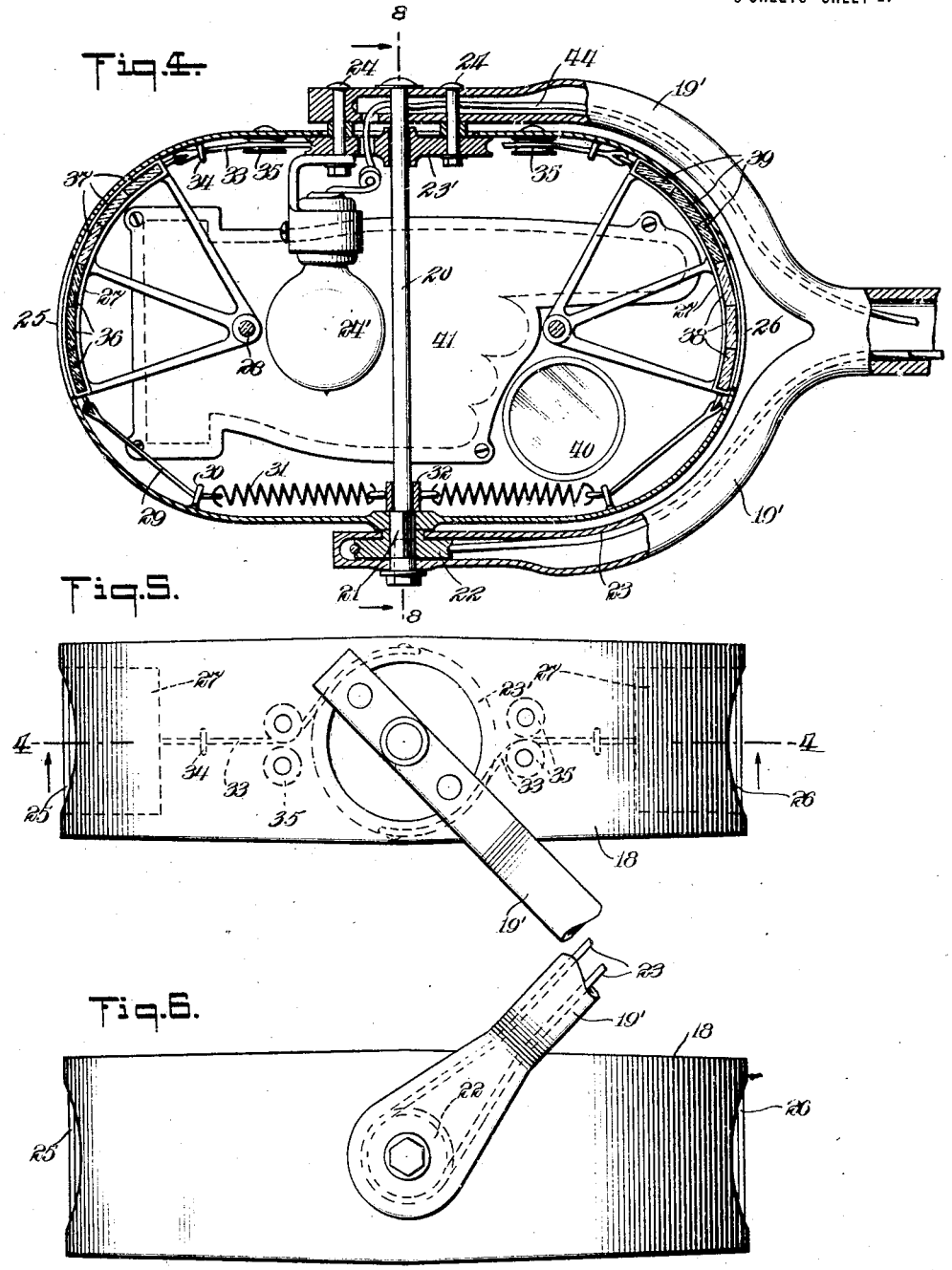

G. W. BRINGMAN.
AUTOMOBILE SIGNAL LAMP.
APPLICATION FILED SEPT. 30, 1919. RENEWED APR. 8, 1921.
1,381,701.
Patented June 14, 1921.
3 SHEETS—SHEET 3.
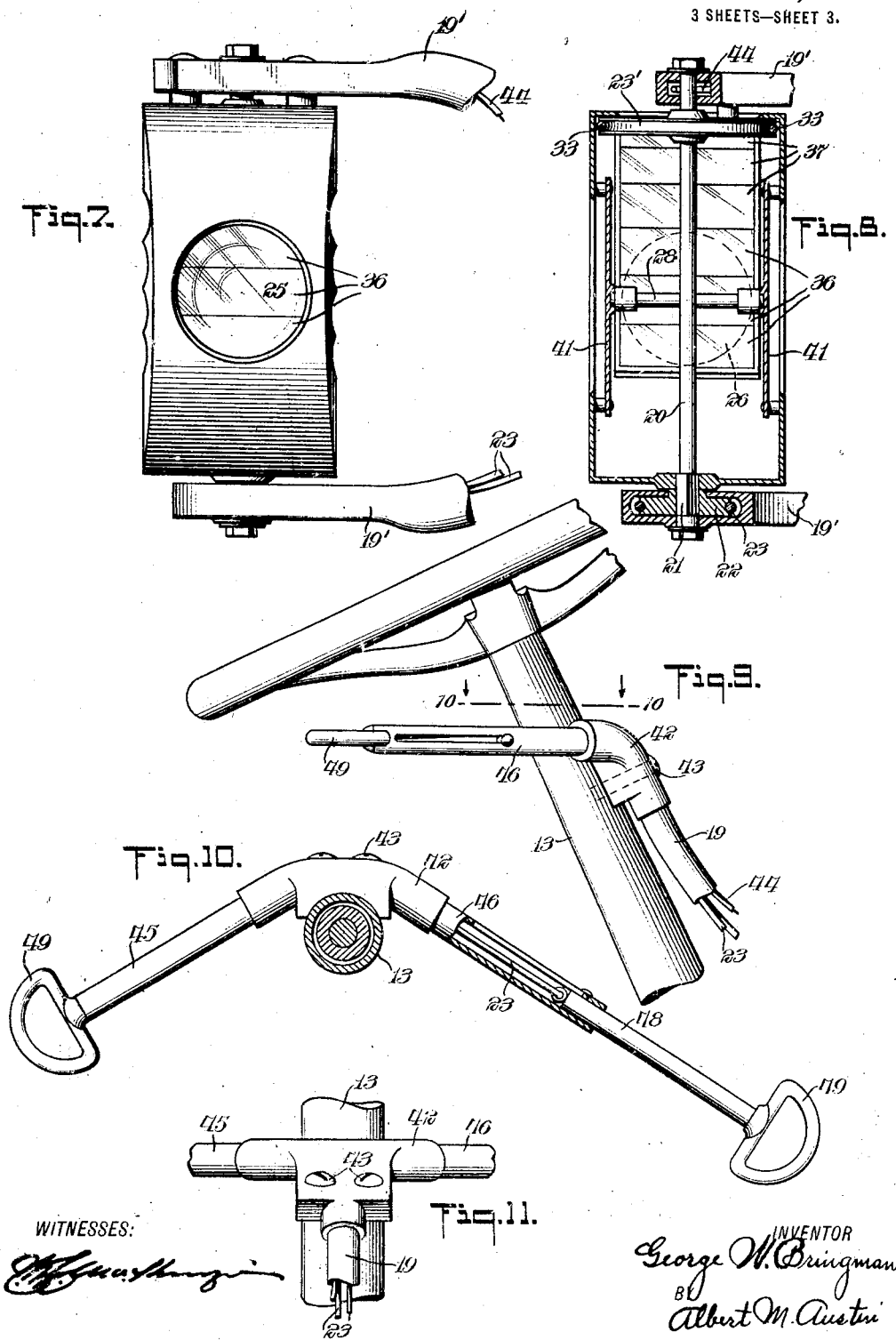

UNITED STATES PATENT OFFICE.

GEORGE W. BRINGMAN, OF CLEVELAND, OHIO.

AUTOMOBILE SIGNAL-LAMP.

1,381,701.      Specification of Letters Patent.      Patented June 14, 1921.

Application filed September 30, 1919, Serial No. 327,587. Renewed April 8, 1921. Serial No. 459,715.

*To all whom it may concern:*

Be it known that I, GEORGE W. BRINGMAN, a citizen of Germany, and resident of Cleveland, in the county of Cuyahoga and State of Ohio, have invented certain new and useful Improvements in Automobile Signal-Lamps, of which the following is a specification.

The invention relates to an automobile signaling device of the character in which an indicator, such as a pointer, will indicate to the operator in rear that the equipped vehicle is about to turn to the right or left, and in which a notice propelling signal, such as a colored sign, or a light, is simultaneously presented to view.

The primary object of the invention is to provide a simple form of combined indicator and light signal which when actuated by a selective control mechanism will simultaneously change the character of light projected therefrom and cause a pointer to shift to and from its normal inoperative position.

Another object of the invention is to provide a simple form of device of the class described, which can be readily mounted in any convenient position on a vehicle which can be arranged so that it may be conveniently actuated by the operator's hands while positioned on the steering wheel and which will present signal elements visible to the operator as well as to the parties intended to be warned by the functioning of the device.

Another object of the invention is to provide in such a device, a construction which can be easily and positively actuated mechanically and without the necessity of using any power except the manual power necessary to swing a light body about a vertical disposed axis of rotation.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a fragmentary view of a portion of an automobile at the steering station showing the left side of the wind shield with a preferred embodiment of the invention attached thereto and with the indicator element thereof in position to designate that the vehicle is about to turn to the right;

Fig. 2 is a separate view of the attachment shown in Fig. 1, but with the indicator pointing to the left;

Fig. 3 is a horizontal sectional view taken on the line 3—3 of Fig. 1 showing the lamp casing in normal position in full lines and in active signaling positions in dotted lines;

Fig. 4 is an enlarged sectional view of the lamp casing and its mounting, taken on the line 4—4 of Fig. 3;

Figs. 5 and 6 are plan views respectively looking down and looking upwardly on the disclosure in Fig. 4;

Fig. 7 is an end view of the device shown in Fig. 4 viewing the same from the left-hand end of the figure;

Fig. 8 is a vertical sectional view taken on the line 8—8 of Fig. 4; looking in the direction indicated by the arrows;

Fig. 9 is a view in side elevation of the control mechanism mounted on the steering column;

Fig. 10 is a horizontal sectional view taken on the line 10—10 of Fig. 9 and with parts of the control broken away to show internal construction; and Fig. 11 is a detail view in end elevation of the control looking at the same from the right hand side of Fig. 9.

In the following description and in the claims, parts will be indentified by specific names for convenience of expression but they are intended to be as generic in their application to similar parts as the art will permit.

In Fig. 1 there is shown a vehicle, such as an automobile, indicated symbolically by the reference character 12 and particularly showing the portion thereof adjacent the steering station. The vehicle is shown provided with the usual steering column 13 and wind shield 14 positioned in advance of the steering station. The wind shield includes the frame 15, providing a convenient support for the signaling device particularly forming the subject-matter of this invention.

This device constitutes an article of manufacture designed to be sold as an automobile accessory and includes a lamp bracket 16 provided with a clamp 17 by means of which the bracket may be demountably positioned on the frame 15 and which bracket carries at its outer end the lamp casing 18. There is also provided a control mechanism shown in Figs. 9 to 11 and designed to be mounted on the steering column or other convenient support and connected to the lamp casing through a flexible cable 19.

The lamp bracket 16 is in the form of a tubular member constructed to accommodate the electric supply wires and control connection hereinafter described. The bracket is angularly disposed relative to the clamp 17, as shown in Fig. 3 so as to extend forwardly and outwardly from the vehicle so that the device is visible not only to the operator in the car behind but also visible to the operator in the car equipped with the device. The outer end of the lamp bracket is bifurcated to form a yoke 19′, the ends of which yoke provide a support for mounting the lamp casing for rotary movement about a vertical axis defined by the pivoting bolt 20′ centrally disposed in Fig. 4.

The lamp casing is in the form of a prolate spheroid with its lower side of greater thickness than the other sides and fitted on the lower squared end 21 of the bolt 20′. This squared end is also provided, within the outlines of the lower arm of the yoke 19′, with a turning wheel 22 about which is passed a flexible wire 23 leading to the control mechanism, as hereinafter more fully described. A stationary wheel 23 is mounted concentrically upon the pivot bolt 20 at the upper side of the casing and is fixed to the upper arm of the yoke 19′ by means of through bolts 24. One of these bolts provides a support for a source of light 24′ positioned adjacent the center of the lamp casing and preferably in alinement with the centrally disposed longitudinal optic axis of the casing which axis extends at right angles to the axis of rotation of the casing. Opposite ends of the casing, in line with said optic axis, are provided with a pair of light apertures which, for convenience of designation, are herein referred to as the rear light aperture 25 and the front light aperture 26. Each end of the lamp casing is provided with a screen 27 for controlling the character of light projected through its light aperture. As the parts are similar in construction at each end of the casing, except for obvious reversal of position, the detail description of the screen and its control mechanism at one end will be sufficient for the mechanism at the opposite end.

The screen is of general triangular shape in side view as shown in Fig. 4 and is pivoted at its apex end, and is connected to a link 29 which passing through a guiding eye 30 has its opposite end attached to one end of a returning spring 31. The opposite end of the returning spring is attached to a sleeve 32 loosely mounted upon the lower end of the bolt 20. The opposite or upper end of the frame is connected to a flexible connection 33 which passes first through a guiding eye 34, about a pulley wheel 35 and has its opposite end trained partly about one side of the stationary wheel 23. It will be understood from Fig. 5, that the flexible connection from the oppositely disposed frames is passed both in clockwise direction about the stationary wheel and about opposite sides thereof so that the movement of the casing will tend either to wind or unwind the flexible connections from the wheel 23.

For convenience in construction the light affecting elements of the screens are made preferably of small pieces of glass so as to provide for different colors in different parts of the screen and to permit the utilization of flat glass plate. In Fig. 4 the frame at the rear end 27 is provided with a green screen formed of the glass plates or lens designated 36 and the upper part is formed of the plates designated 37 which form a red light. Similarly at the opposite or forward end of the casing the plates designated 38 form a white light which will be projecting forwardly, while a green light is projected rearwardly, but when the lamp casing has been rotated into the full line position shown in Fig. 3 then a red light will be projected from both the forward and rear apertures as hereinafter more fully described in stating the operation of the device.

Opposite sides of the lamp casing is provided with a small red light opening, one of which 40 is shown in Fig. 4, but it is to be understood that a similar light is disposed on the opposite side of the casing. From this construction it will be apparent that when the device is in its indicating position, as shown in both Figs. 1 and 2, a red light will show on all four sides of the casing.

An indicator 41 is positioned on opposite sides of the casing which indicator is herein shown to be a white enameled plate in the form of a hand with the index finger of each hand pointing in the same direction.

Referring particularly to the control mechanism shown in Figs. 9 to 11 inclusive, the mechanism includes a three way T 42 encircling the steering column and fastened thereto as by the screens 43. The cable 19 containing the control wires 23 and the electric wire 44 for supplying the electric light 24′ is passed into the lower open end of the T.

The wires 23 are passed in opposite directions respectively through the tubular extensions 45 and 46 of the T shown in Fig. 10. These extensions form barrels in which are slidably mounted the inner end of rods 48, the outer ends of which rods are formed into handles 49 which are preferably disposed relatively close to and below the steering wheel so that they may be grasped by the forefingers of the hands which are on the steering wheel.

In operation and assuming that the parts are in the position shown in full lines in Fig. 3 and in the position shown in Fig. 4, in which position the indicating hands are both pointing forward with a green light projected from the rear aperture and a white light projecting from the front aperture, the parts are then in normal position. Suppose that the operator desires to indicate that he is intending to turn to the right. He then reaches down from the steering wheel and moves the right hand handle 49 outwardly as shown in Fig. 10. This has the effect of acting through the flexible connections 23 and acts on the bolt 20 to swing the lamp casing as a whole into the position extending transversely of the line of movement of the vehicle and into the position shown in Fig. 1 with the hand pointing to the right. At the same time the bodily movement of the lamp casing will tend to wrap the flexible connections 33 about the stationary wheel 23 this drawing on the screen frame and shifting the same so that a red light will be projected from all four sides of the casing, that is, a red light will be projected through the forward and rear apertures and as usual red light will be projected through the side openings 40, which now become respectively front and rear openings. The light 24' being back of the indicating hands will show the same in outline so that the light is flashed red simultaneously with the presenting to view of the white indicator.

Releasing tension on the projected handle 49 will permit the springs 31 to react and thus simultaneously move the lamp casing into its front-to-rear position and to restore the screens to their normal position as hereinbefore indicated.

Having thus described my invention, I claim:

1. In a device of the class described, the combination of a lamp casing, means for mounting the same for rotary movement about a vertical axis, said casing provided with two oppositely disposed light apertures, one constituting a forward light aperture and the other constituting a rear light aperture, an indicator carried by the casing visible from the side of the casing and invisible as an indicator from the rear of the casing, a source of light within the casing for directing light rays through said apertures, means for rotating the casing over an angle of approximately 90°, whereby said forward and rear apertures become side apertures and the indicator becomes visible from the rear of the casing, and means acting on the casing to restore the same to its normal position.

2. In a device of the class described, the combination of a lamp casing, means for mounting the same for rotary movement, said casing provided with a light aperture and provided with an indicator relatively associated so that the indicator and light aperture are not visible from the same external point, a source of light within said casing, a two-colored screen operatively associated with said aperture to cause at will two different colors of light to be projected therefrom and operatively connected to replace the part of the screen having one color with a part having the other color when said casing is rotated, and means for rotating said screen thereby to change the color of the projected light as the indicator is shifted to and from its indicating position.

3. In a device of the class described, the combination of a lamp casing mounted for rotary movement and provided with a light aperture and with an indicator associated with the light aperture to give signals in either light or dark surroundings, a relatively fixed multi-color screen operably associated with said aperture to control the color of the light projected therethrough in different positions of the casing, and means for shifting the casing with its indicator from one position to another and thus cause the aperture to move from one to another part of the screen when the aperture is facing in a different direction.

4. In a device of the class described, the combination of a lamp casing mounted for rotary movement and provided with a light aperture, means acting on the casing to return the same to a normal position when displaced therefrom, means for causing a light of one color to be projected through said aperture when the casing is in its normal position and means controlled by the movement of the casing from said normal position for causing a light of a different color to be projected through said aperture.

5. In a device of the class described, the combination of a lamp casing mounted for rotary movement and provided with a light aperture and with an indicator associated with the light aperture to give signals in either light or dark surroundings, means acting on the casing to return the same to a normal position when displaced therefrom, means for causing a light of one color to be projected through said aperture when the casing is in its normal position, means controlled by the movement of the casing from said normal position for causing a light of a different color to be projected through said aperture and a control operatively connected to move the same from its normal position.

6. In a device of the class described, the combination of a lamp casing, having a source of light therein for directing a signal light from the casing, means for mounting the casing for rotary movement, means acting on the casing tending to hold the same in a normal position, a control, a connection between said control and said casing to move the same from its normal position and against the action of said holding means, and light affecting means connected with the casing for changing the character of the light projected from the casing simultaneously with changes in position of the casing.

7. In a device of the class described, the combination of a lamp casing mounted for rotary movement about a vertical axis and having a pair of light apertures mounted approximately 180° apart about said axis, a source of light in said casing for directing signaling light rays through said apertures, said pair of said apertures being each provided with a light screen, each of said light screens being operatively connected to the casing whereby the rotation of the casing about its axis will cause said screens to move across their respective apertures and control means acting on said casing to rotate the same from its normal position.

8. In a device of the class described, the combination of a lamp casing mounted for rotary movement about a vertical axis and having four light apertures mounted approximately 90° apart about said axis, a source of light in said casing for directing signaling light rays through said aperture in four directions, an oppositely disposed pair of said apertures being each provided with a light screen, each of said light screens being operatively connected to the casing whereby the rotation of the casing about its axis will cause said screens to move across their respective apertures.

9. In a device of the class described, the combination of a lamp casing mounted for rotary movement about a vertical axis and having four light apertures mounted approximately 90° apart about said axis, a source of light in said casing for directing signaling light rays through said apertures in four directions, an oppositely disposed pair of said apertures being each provided with a light screen, each of said light screens being operatively connected to the casing whereby the rotation of the casing about its axis will cause said screens to move across their respective apertures, control means acting on said casing to rotate the same from its normal position and a pair of indicators carried by the lamp casing on opposite sides of said source of light, each indicator pointing in the same direction and visible wth one of said light apertures.

10. In a device of the class described, the combination of a fixed support, a lamp casing mounted on said support for rotary movement about a fixed axis and provided with a light aperture, a stationary wheel fixed to the support concentric with said axis, a screen mounted in said casing for movement across said aperture, a flexible connection having one end fixed to said wheel and the other end attached to said screen, said connection adapted to be wound on the periphery of said wheel by the rotary movement of the casing thereby to move the screen across the aperture, and means acting to return the aperture in the casing and screen to their normal relative position.

11. In a device of the class described, the combination of a fixed support, a lamp casing mounted on said support for rotary movement about a fixed axis and provided with a light aperture, a stationary wheel fixed to the support concentric with said axis, a screen frame pivotally mounted in said casing for movement across said aperture, a flexible connection between said wheel and frame whereby the rotation of the casing will cause the connection to wind on said wheel to shift the screen frame relative to the aperture.

12. In a device of the class described, the combination of a fixed support, a lamp casing mounted on said support for rotary movement about a fixed axis and provided with a light aperture, a stationary wheel fixed to the support concentric with said axis, a screen frame pivotally mounted in said casing for movement across said aperture, a flexible connection between said wheel and frame whereby the rotation of the casing will cause the connection to wind on said wheel to shift the screen frame relative to the aperture and resilient means acting on said frame tending to restore the same to its normal position relative to the aperture.

13. In a device of the class described, the combination of a fixed support, a lamp casing mounted on said support for rotary movement about a fixed axis and provided with a light aperture, a stationary wheel fixed to the support concentric with said axis, a screen frame pivotally mounted in said casing for movement across said aperture, a flexible connection between said wheel and frame whereby the rotation of the casing will cause the connection to wind on said wheel to shift the screen frame relative to the aperture and resilient means acting on said frame tending to restore the same to its normal position relative to the aperture and a turning wheel fixed to said casing concentric with its axis of rotation and means engaging said turning wheel to rotate the casing and thus change the normal relation between the screen frame and the aperture.

14. In a device of the class described, the combination of an exposed casing mounted for rotary movement and provided with a light aperture rotatable with the casing, a source of light in said casing and means controlled by the position of the casing for governing the color of the light projected from said aperture.

Signed at Cleveland, in the county of Cuyahoga and State of Ohio, this twenty-third day of September A. D. 1919.

GEORGE W. BRINGMAN.